United States Patent [19]

Christophersen et al.

[11] 4,215,079

[45] Jul. 29, 1980

[54] METHOD AND APPARATUS FOR CONTACTING LIQUIDS AND GASES

[75] Inventors: Steve Christophersen, Richfield; Raymond G. Neaman, St. Louis Park, both of Minn.

[73] Assignee: Donaldson Company, Inc., Minneapolis, Minn.

[21] Appl. No.: 888,995

[22] Filed: Mar. 22, 1978

[51] Int. Cl.² .............................................. B01F 3/04
[52] U.S. Cl. ................................. 261/36 R; 261/103; 261/DIG. 11
[58] Field of Search ............... 261/29, 36 R, 104, 107, 261/112, 154, DIG. 11, DIG. 15, DIG. 72

[56] References Cited

U.S. PATENT DOCUMENTS

| | | | |
|---|---|---|---|
| 2,002,273 | 5/1935 | Parker et al. | 261/154 X |
| 2,791,408 | 5/1957 | Lewis | 261/DIG. 11 |
| 3,262,682 | 7/1966 | Bredberg | 261/DIG. 11 |
| 3,272,484 | 9/1966 | Brand et al. | 261/DIG. 11 |
| 3,304,069 | 2/1967 | Palmer, Sr. | 261/DIG. 11 |
| 3,363,885 | 1/1968 | Meek | 261/DIG. 11 |
| 3,415,502 | 12/1968 | Munters | 261/112 |
| 3,500,615 | 3/1970 | Meek | 261/112 X |
| 3,520,416 | 7/1970 | Keedwell | 261/104 X |
| 3,523,681 | 8/1970 | Jaye | 261/154 X |
| 3,792,841 | 2/1974 | Munters | 261/112 |
| 3,917,764 | 11/1975 | Phelps | 261/DIG. 11 |
| 3,947,532 | 3/1976 | Skold et al. | 261/112 |

OTHER PUBLICATIONS

Buffalo Forge Co., Bulletin AC-900B.
Envirotech Corp., Catalog 28-A, 1976.
Baltimore Aircoil Co. Inc., Bulletin S240/1-0, Apr., 1976, S219/1-0, Nov., 1976, S220/1-0, May, 1974.
Marley Company, Bulletin DF-M15-74.

Primary Examiner—Richard L. Chiesa
Attorney, Agent, or Firm—Merchant, Gould, Smith, Edell, Welter & Schmidt

[57] ABSTRACT

An apparatus and method for contacting liquids and gases is disclosed. A contact body is comprised of a plurality of pleated porous media elements which are disposed one above another. Each element is formed in a generally zig-zag configuration with pleats and upper and lower tips. Air passages are formed between the pleats of the elements. The elements are supported one above another in a generally horizontal disposition with all of the air passages substantially parallel to one another. A mechanism is provided for supplying water to an uppermost element to saturate all of the elements with water. Substantially all of the water which moves downwardly from the uppermost element to a lowermost element flows through the elements without creating a film flow of water between the uppermost and the lowermost elements.

22 Claims, 7 Drawing Figures

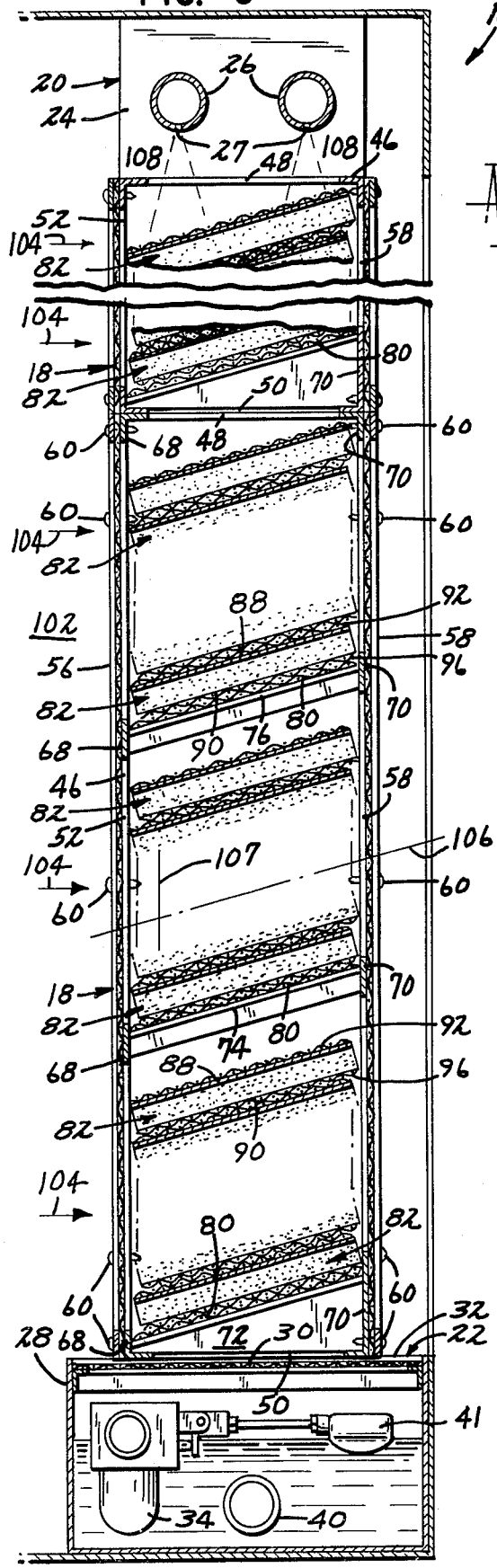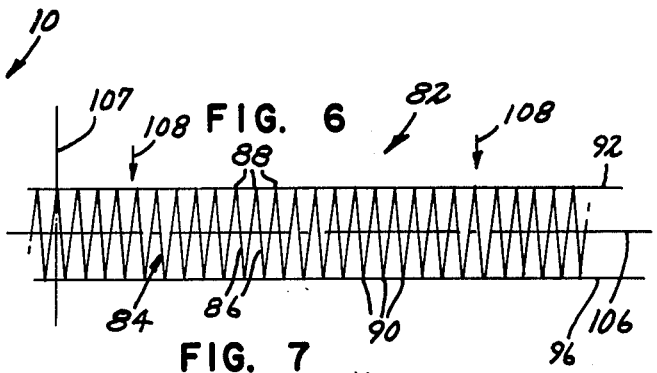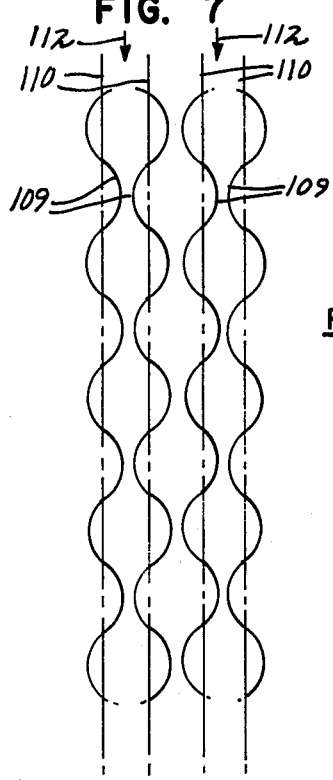
PRIOR ART

METHOD AND APPARATUS FOR CONTACTING LIQUIDS AND GASES

BACKGROUND OF THE INVENTION

The present invention relates broadly to methods and apparatus for contacting liquids and gases. Such apparatus find application as evaporative coolers and cooling towers. Cooling towers are utilized for the cooling of water and within air conditioning systems. Evaporative coolers are used generally to cool and moisturize air for various applications. The cooled moisturized air produced by an evaporative cooler has been found especially useful in increasing the efficiency of gas turbines in localities where the ambient air is relatively dry and hot.

Evaporative coolers and cooling towers both operate in a similar manner. Air is forced over water which is gravitating downwardly through the apparatus in a heat exchange relationship. In both types of apparatus the water flows through a tortuous path. The tortuous path is formed by elements known as contact bodies, packing, or media elements. The media elements are usually formed of corrugated sheet material. The corrugated sheets are sandwiched together with the corrugations of adjacent sheets angled relative to one another. In this manner, a tortuous path is provided for the water in a downwardly gravitating direction.

So that the water will flow downwardly by gravity between the media elements, the media elements are arranged in a disposition in which a plane passing medially through each of the corrugated sheets lies substantially in a vertical plane. Due to this orientation, a tortuous cross air flow path is also provided.

As noted in U.S. Pat. No. 3,415,502 to Munters, issued Dec. 10, 1968, the media elements may be constructed of a wetting or absorbing material, such as fibers of cellulose or asbestos. The wetting of the media elements, however, is not intended to create water flow through the elements which is a major portion of the water flow through the cooling tower of Munters. The corrugated sheets in Munters, as is typical of prior art cooling towers and evaporative coolers, are vertically disposed and utilize a film flow of water between and over the media elements as the water flow through the apparatus. The wetting of the media elements by Munters is apparently for the purpose of aiding the film flow of the water over the elements. The contact between the air passing through the media elements of Munters is between the film of water and the air. As will be noted hereinafter, the gas to liquid contact in the present invention is not between a film flow of a liquid and a gas.

Liquid and gas contact bodies of the prior art which utilize a film flow of water have generally experienced a water carryover problem. Water carryover occurs when the water flowing over the media elements is blown out of the air output side of a contact body. Various methods have been utilized to either minimize the amount of water carryover or to stop the water carryover after it exits the contact body. In U.S. Pat. No. 3,792,841 to Munters, issued on Feb. 19, 1974, a specific disposition of the corrugated sheets is utilized to attain a uniform film flow over the sheets and to minimize the tendency of the water to be entrained with the air stream flowing through the contact body. In U.S. Pat. No. 3,917,764 to Phelps, issued on Nov. 4, 1975, a drift eliminator is disposed across the path of air exiting a contact body in order to entrap any water carryover. Since the present invention does not utilize a film flow of water, the problem of water carryover is minimized.

SUMMARY OF THE INVENTION

The present invention is directed to an apparatus and method for contacting liquids and gases. A contact body is comprised of a plurality of pleated porous media elements which are disposed one above another. Each element is formed in a generally zig-zag configuration with pleats and upper and lower tips. Air passages are formed between the pleats of the elements. The elements are supported one above another in a generally horizontal disposition with all of the air passages substantially parallel to one another. A mechanism is provided for supplying water to an uppermost element to saturate all of the elements with water. Substantially all of the water which moves downwardly from the uppermost element to a lowermost element flows through the elements without creating a film flow of water between the uppermost and the lowermost elements.

Each pleat and tip of an element extends in a first direction across an element. A plane passing medially of the upper and lower tips of an element forms a medial plane of a respective element. The medial plane of each element passes transversely of a vertically extending plane. The vertically extending plane is transverse to the first direction.

In the preferred embodiment, the medial plane of each element is disposed downwardly toward an air inlet side of the contact body. The elements are disposed downwardly at an angle no greater than 30° above a horizontal plane intersecting the elements.

Also in the preferred embodiment, a plurality of the contact bodies are arranged within a contact body housing. At least two contact bodies are arranged in a side-by-side relationship and at least two more contact bodies are supported above the lowermost two contact bodies. The water supply means includes a water reservoir disposed below and in fluid communication with the contact bodies. A water pump is provided for pumping the water from the water reservoir to a plurality of water supply conduits disposed above the uppermost contact bodies.

In the method of the present invention a continuous flow of water is established between the uppermost media element and the lowermost media element through each of the elements in such a manner that substantially all of the water flows from the uppermost element to the lowermost element through the elements. The water flows through the elements without creating a film flow of water between the uppermost and the lowermost elements.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWING

FIG. 5 is a sectional view taken along lines 5—5 of FIG. 2.

FIG. 6 is a diagrammatic view of a pleated porous media element of the present invention illustrating a plane passing medially of the element.

FIG. 7 is a diagrammatic view of prior art media elements illustrating planes passing medially of the elements.

DETAILED DESCRIPTION OF THE INVENTION

Figure 1:
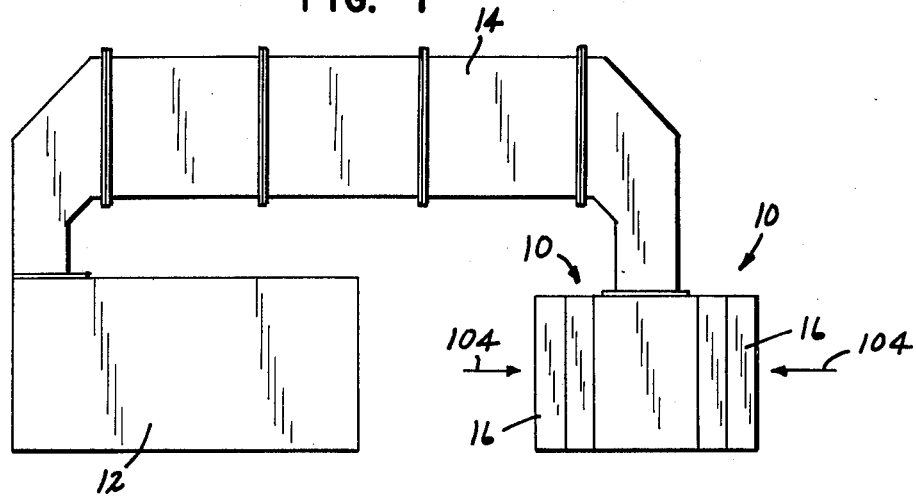
FIG. 1 is a diagrammatic view illustrating a pair of liquid and gas contact apparatus utilized with a gas turbine.

Referring to the drawings in detail, wherein like numerals indicate like elements, there is shown in FIG. 1 a schematic illustration of a liquid and gas contact apparatus in accordance with the present invention designated generally as 10. FIG. 1 illustrates the apparatus 10 operatively connected to a gas turbine 12 by inlet ducting 14. As illustrated in FIG. 1, inlet filtration mechanisms 16 may be disposed upstream of the apparatus 10. FIG. 1 is merely one typical illustration of a use of the apparatus 10 as an evaporative cooler which cools and moisturizes air entering a gas turbine 12 in order to increase the efficiency of the gas turbine 12. Additional apparatus 10 may be disposed in series if required. Also, in some applications, the inlet filtration devices 16 may be disposed on either side of the liquid and gas contact apparatus 10.

Figure 2:
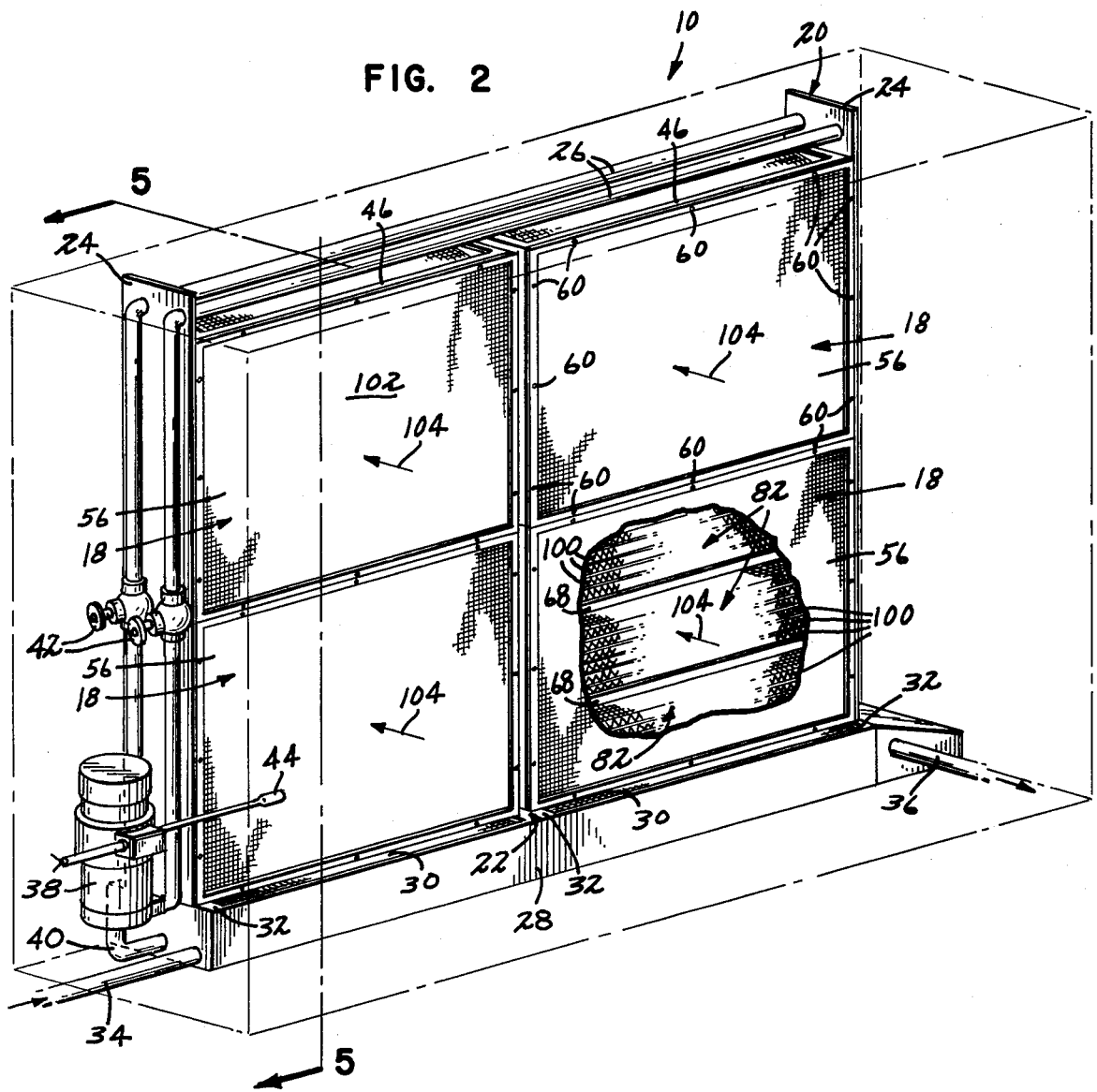
FIG. 2 is a front perspective view of a liquid and gas contact apparatus in accordance with the present invention with portions broken away for clarity.

A single liquid and gas contact apparatus 10 is illustrated in perspective in FIG. 2. The apparatus 10 includes a plurality of contact bodies 18 stacked within a contact body housing 20. The housing 20 includes a base member 22 which has a sufficient width to support a pair of contact bodies 18 in a side-by-side relationship. A pair of opposite sidewall members 24 extend upwardly from the base member 22. The sidewall members 24 in the embodiment shown in FIG. 2 have a sufficient height to support at least two contact bodies 18 one upon another.

Water is supplied to the uppermost ends of the contact bodies 18 by a pair of water supply conduits 26. Each water supply conduit 26 has a plurality of apertures 27 disposed along its length and facing downwardly toward the uppermost elements 18. The base member 22 forms the top of a water reservoir 28. The base member 22 includes apertured screen sections 30 which provide a water inlet to the water reservoir 28 for water flowing downwardly out of the lowermost contact bodies 18. The base member 22 also includes rigid support plates 32 for supporting the contact bodies 18.

A water inlet conduit 34 communicates with the water reservoir 28 at a first side of the reservoir 28 adjacent one of the sidewalls 24. A water outlet conduit 36 communicates with a second side of the water reservoir 28 adjacent an opposite sidewall 24. A water pump 38 is supported adjacent the reservoir 38. The intake side of the water pump 38 communicates with the water reservoir 28 through conduit 40. The output of the water pump 38 is connected to the water supply conduits 26. A float valve 41 is connected to the inlet conduit 34. If the water level in the reservoir 28 falls below a predetermined level, the float valve 41 opens and allows additional water to enter the reservoir 28.

The water pump 38 may be of variable output or of a known output. Also, adjustable valves 42 may be interposed between the water pump 38 and the outlet apertures 27 of the water supply conduits 26. The amount of water supplied to the contact bodies 18, thus, may be controlled either by controlling the water pump 38 or the adjustable valves 42. When the liquid and gas contact apparatus 10 is utilized with a gas turbine, the ambient air temperature entering the gas turbine is utilized to determine if cooling and moisturizing of the inlet air is required. Hence, one method of controlling the water flow through the apparatus 10 is by a temperature probe 44. Any conventional temperature measurement device connected to an on-off relay switch for turning on the water pump 38 may be utilized as the temperature probe 44. The probe 44 would turn on the water pump 38 when the ambient air temperature exceeds a specified value. The starting of the water pump 38 may also be controlled manually.

Figure 3:
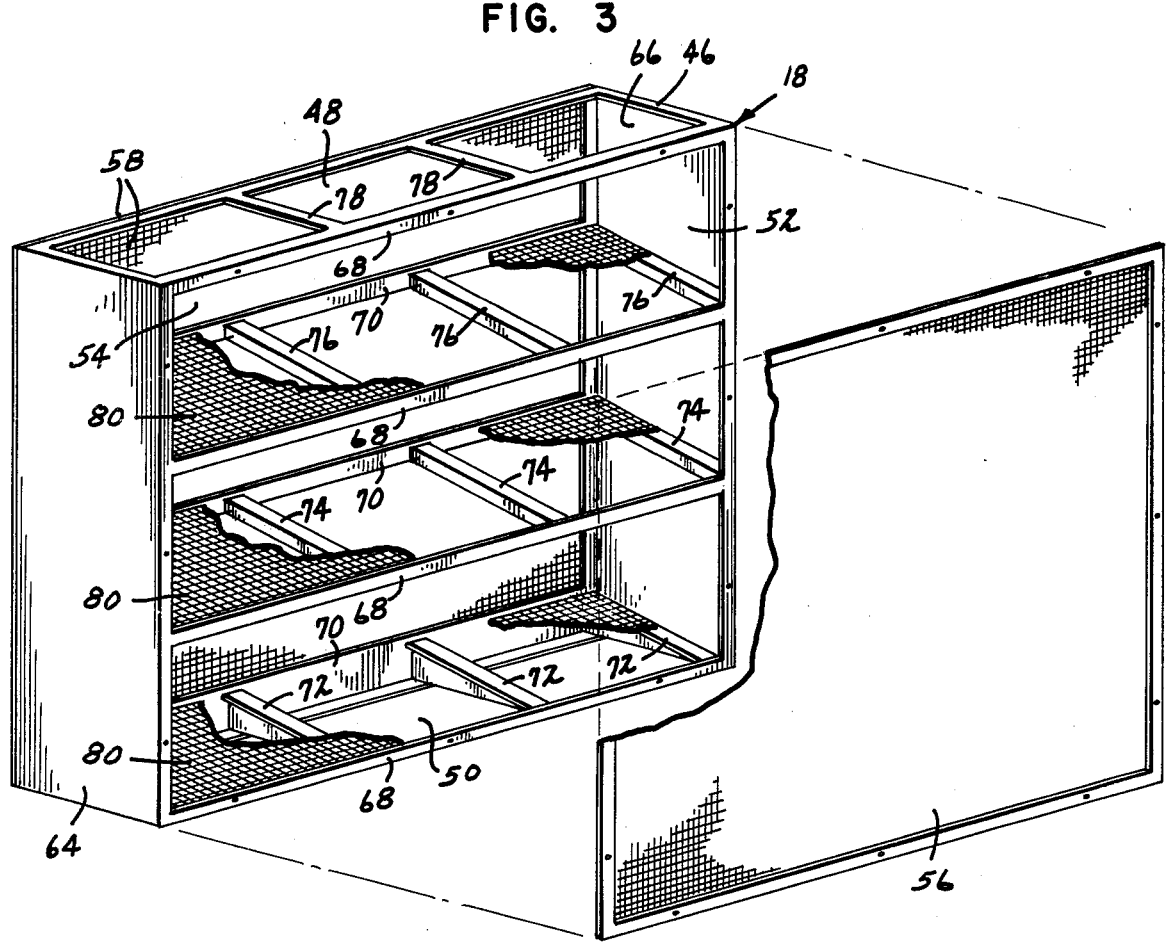
FIG. 3 is a perspective view of the frame of a single contact body with portions broken away and portions exploded.

Each contact body 18 includes a frame member 46 having a generally open rectangular box configuration, as best seen in FIG. 3. The frame member 46 has a substantially open top 48, bottom 50, front face 52, and back face 54. A front screen 56 is secured over the open front face 52 and a back screen 58 is secured over the open back face 54. One or both of the screens 56, 58 may be removably secured to the frame member 46 by suitable fasteners such as screws 60. For purposes of clarity, the front screen 56 is shown removed from the front face 52 in FIG. 3.

The frame member 46 has a pair of opposite sidewall members 64, 66. A plurality of front crossbars 68 extend across the front face 52 and interconnect with the sidewall members 64, 66. A plurality of back crossbars 70 extend across the back face 54 and interconnect with the sidewall members 64, 66. The front and back crossbars 68, 70 are disposed in opposing pairs. A plurality of transverse bars 72 extend between and are connected to the lowermost pair of opposing crossbars 68, 70. Similar sets of transverse bars 74, 76, 78 extend between and are connected to successive pairs of crossbars 68, 70. A discrete support screen 80 is secured to each set of transverse bars 72, 74 and 76. For purposes of clarity, only portions of the support screens 80 are illustrated in FIG. 3. A plurality of porous pleated media elements 82 are supported by each of the support screens 80. So that the frame member 46 may be seen in detail, FIG. 3 does not illustrate any of the pleated porous media elements 82.

Figure 4:
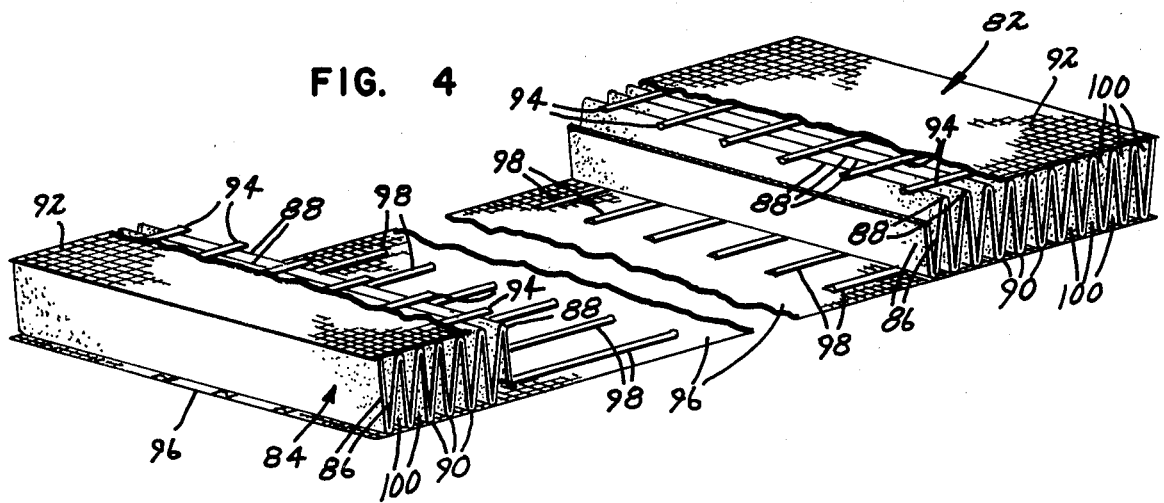
FIG. 4 is a perspective view of a single pleated porous media element with portions broken away.

As best seen in FIG. 4, the element 82 is formed of a pleated material 84. The material 84 is formed in a plurality of pleats 86 having upper tips 88 and lower tips 90. A means is provided to hold the material in a pleated configuration. In the preferred embodiment, an upper screen 92 is secured to the upper tips 88 by a plurality of adhesive beads or lines 94. A lower screen 96 is secured to the lower tips 90 by a plurality of adhesive beads or lines 98. The upper and lower screens 92, 96 may be conventional metal or plastic screens. The adhesive beads 94, 98 may be a conventional epoxy or plastic adhesive. Thus, when the material 84 becomes saturated with a liquid, the screens 92, 96 hold the material 84 in a pleated configuration.

The stacking of a plurality of media elements 82 upon the support screens 80 is best seen in FIG. 5. The media elements 82 are stacked one upon another in such a manner that the pleats 86 and tips 88, 90 run generally parallel to one another. Air passages 100 are formed between the pleats and run generally parallel with the pleats in a first direction across each element 82. A plurality of generally parallel air passages 100 is thus formed through each contact body 18. The air inlet side 102 is shown in front of the apparatus illustrated in FIG. 2 and to the left of the apparatus in FIG. 5. Air enters the contact bodies 18 in the direction of arrows 104 and passes through the air passages 100.

Each media element 82 is disposed in a substantially horizontal disposition which is generally transverse to a vertical plane passing through a respective media element 82. The distinction between the orientations of the media elements 82 of the present invention and the orientation of media elements of the prior art is best understood by referring to FIGS. 6 and 7. FIG. 6 illustrates a media element 82 of the present invention. A plane passing medially of the element 82 forms a medial plane 106 of a respective element 82. As seen in FIGS. 5 and 6, the medial plane 106 is disposed substantially horizontal or transverse to a vertical plane 107 passing through a respective element 82. The vertical plane 107 is generally transverse to the first direction in which the pleats 86 extend.

In the present invention water is supplied to the elements 82 at the uppermost end of the apparatus 10 and flows downwardly through the elements 82 in the direction of arrows 108. In view of the substantially horizontal orientation of the elements 82, the water is constrained to flow through the elements 82 rather than by a film flow over the elements. FIG. 7 illustrates the typical film flow of water over media elements 109 of the prior art. The corrugated media elements 109 of the prior art are disposed in a generally vertical direction with the medial planes 110 passing medially of the media elements 109 being substantially vertical. Water is supplied to the media elements 109 in the direction of arrows 112. As mentioned above, while the media elements 109 may become saturated with water, substantially all of the flow of the water through contact bodies of the prior art is via a film flow over the media elements 108. In contradistinction, the substantially horizontal disposition of the media elements 82 of the present invention causes substantially all of the flow through the contact bodies 18 to flow through the media elements 82 by a wicking effect.

The media elements 82 are preferably disposed at an incline downwardly toward the air intake side 102. In this manner, if an excess water flow is created which does not flow by wicking through the elements, this excess water flow will flow downwardly toward the air inlet side 102. It should be understood that any excess water flow is undesirable and does not contribute substantially to the gas and liquid contact functioning of the apparatus 10. The intended air contact with a liquid in the apparatus 10 is between the air passing through the passages 100 and the liquid saturated material 84. A downward incline of approximately 15° above the horizontal has been found suitable and preferably the incline should not exceed 30°.

If excess water is supplied to the media elements 82 such that all the water is not absorbed by the media elements 82, a slight excess flow of water may occur over the media elements. Due to the slight incline of the media elements 82 toward the air inlet side 102, the excess water will flow toward the air inlet side 102 against the direction of the air flow. The air flow thus forces the excess water back in the direction of the media elements 82. If the excess water flow is minimal, the excess water can be absorbed back into the media elements 82 since the air flow will hold the water within the confines of the media elements 82.

The method of the present invention and operation of the apparatus of the present invention should be self-explanatory from the above description, and only a brief summary of the method and operation of the present invention follows. Water is supplied through the apertures 27 of the conduits 26 to the uppermost contact bodies 18. All of the media elements 82 are saturated with water to the point where a continuous flow through the media elements 82 from the uppermost element 82 to the lowermost element 82 is established. The flow rate of water under given conditions of air flow, temperature and humidity can be readily determined experimentally. Under a given set of temperature, humidity and air flow conditions the water is adjusted until a continuous flow through the elements 82 is established without any appreciable water flow over the elements 82. In this manner, air flowing between the passages 100 will contact the saturated elements to evaporate the water contained therein. The air temperature is thus lowered and the air is moisturized.

The material 84 is preferably a paper-like material formed from fibers of cellulose or inorganic material. The material 84 must be of a density which permits the media elements 82 to become saturated and also allows a flow of water through the media elements by a wicking effect. Applicants believe that the media elements of the prior art are too dense to accomplish such a wicking flow. A wicking flow was not required in the prior art contact bodies, since the primary flow through the contact bodies of the prior art was a film flow over the media elements.

Numerous standard methods for measuring the density of a material, which is used as the material 84, are available. The important consideration in choosing the density of a material used to form the media elements 82 is that the material be sufficiently porous to allow water to flow downwardly through all media elements 82 without creating an appreciable film flow over the elements 82. The water should flow downwardly through the apparatus 10 without creating a film water flow between the uppermost and lowermost elements 82.

One method of specifying the density of a material 84 is by specifying the permeability and pore size of the material. Both permeability and pore size are measured by conventional procedures. Materials having a permeability between 150 and 700 feet per minute to air supplied at a one-half inch water pressure drop through the material and having a median pore size between 150 and 300 microns have been found suitable for use in the method and apparatus of the present invention.

When the apparatus 10 is utilized with a gas turbine 12, the force of the air intake into the turbine 12 is utilized to draw air through the apparatus 10. In other applications, any suitable mechanism is utilized to draw the air through the apparatus 10. Since no appreciable film flow is created in the apparatus 10, the use of drift eliminators at the exit side of the contact bodies 18 is eliminated. Due to the pleating of the material 84, sufficient contact area is provided to lower the temperature of the air passing through the passages 100 and to also moisturize the air passing therethrough within a small frontal area.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed:

1. A liquid and gas contact apparatus comprising:
   (a) a contact body having a plurality of pleated porous media elements, each element being formed in a generally zig-zag configuration with pleats and upper and lower tips;
   (b) air passages formed between said pleats, each air passage extending generally in a single straight line direction from an air inlet side to an air outlet side of said contact body;
   (c) screen means for supporting said elements one above another in a generally horizontal disposition with all of said air passages being parallel to one another; and
   (d) means for supplying water to an uppermost element to saturate all of said elements with water and to establish a downward flow of water through said elements; and
   (e) said screen support means leaving a major portion of the generally horizontal cross-section area of said media elements open to permit water flow directly between adjacent vertically spaced media elements directly through substantially the entire cross-section of each media element and each of said media elements having a porosity sufficient to enable substantially all of the water supplied to an uppermost element by said water supply means which flows to a lowermost element to flow directly through the materials of said media elements through substantially the entire cross-section of each media element.

2. A liquid and gas contact apparatus in accordance with claim 1 including a contact body housing and a plurality of said contact bodies, said housing supporting at least two of said contact bodies in a side-by-side relationship to form a first layer of contact bodies and at least two additional contact bodies in a side-by-side relationship above said first layer of contact bodies.

3. A liquid air gas contact apparatus in accordance with claim 1 wherein said support means supports each of said elements in a disposition slanted downwardly toward said air inlet side by an angle less than 30° above a horizontal plane.

4. A method of cooling and moisturizing air comprising the steps of:
   (a) arranging a plurality of pleated porous media elements having pleats and upper and lower tips one above the other with each of said elements being substantially parallel to the other of said elements to create a plurality of parallel passages each of which extends in a generally single straight line direction from an air inlet side to an air outlet side of said elements and with vertically adjacent media elements being substantially open to one another;
   (b) supplying water to an uppermost element of said elements to saturate all of said elements with water;
   (c) establishing a flow of water from said uppermost element to a lowermost element through each of said elements such that substantially all of the water flowing from the uppermost element to the lowermost element flows directly through substantially the entire cross-section of each element by flowing directly from substantially the entire cross-section area of each one of said media elements directly downward to the one of said media elements supported directly below without creating a film flow of water over and between the elements; and
   (d) passing air between the pleats of said elements from an air inlet side to an air outlet side of the elements to evaporate the water saturated in the elements in order to cool and moisturize the air.

5. A method in accordance with claim 4 wherein step (a) includes arranging said elements so that the pleats of all the elements are substantially parallel to one another and all the lower tips are substantially horizontal.

6. A method in accordance with claim 5 wherein step (a) includes arranging said elements so that all of said lower tips slant downwardly toward said air inlet side by an angle less than 30° above a horizontal plane so that excess water which does not flow through the elements flows downwardly toward said air inlet side.

7. A method in accordance with claim 6 including the steps of:
   (a) collecting the water flowing through said elements in a water reservoir below said elements; and
   (f) pumping water from said reservoir to supply water to said uppermost element.

8. A liquid and gas contact apparatus comprising:
   (a) a contact body having a plurality of pleated porous media elements disposed one above another between a top and a bottom of said contact body;
   (b) each of said media elements being formed in a generally zig-zag configuration with a plurality of pleats having upper tips and lower tips, each pleat and tip extending in a generally linear first direction from an air inlet side to an air outlet side of said elements;
   (c) a plane passing medially of said upper and lower tips of an element forming a medial plane of a respective element;
   (d) air flow passages being formed between the pleats of said elements, all of said air flow passages extending in said generally linear first direction;
   (e) screen means for supporting said elements within said contact body in a disposition in which the medial plane of each element passes transversely of a vertically extending plane, said vertically extending plane being transverse to said first direction;
   (f) means for supplying water to the top of said contact body to saturate said elements with water and to establish a downward flow of water through said media elements; and
   (g) said screen support means leaving a major portion of the surface area of the upper and lower tips open to permit water flow between adjacent vertically spaced media elements directly through substantially the entire cross-section of each media element and each of said media elements having a porosity sufficient to enable substantially all the water supplied to the top of said contact body by said water supply means which flows to the bottom of said contact body to flow directly through the material of said media elements through substantially the entire cross-section of each media element.

9. A liquid and gas contact apparatus in accordance with claim 8 wherein said element support means supports said elements in a disposition in which said medial plane of each element slants downwardly toward said air inlet side so that excess water which does not saturate into the elements flows toward said air inlet side.

10. A liquid and gas contact apparatus in accordance with claim 9 wherein the downward slant of said elements is no greater than 30° above a horizontal plane intersecting an element.

11. A liquid and gas contact apparatus in accordance with claim 8 wherein said porous media elements are sufficiently porous to allow substantially all of the water flowing from the top of said contact body to the bottom of said contact body to flow through said elements.

12. A liquid and gas contact apparatus in accordance with claim 11 wherein the material forming said elements has a permeability between 150 and 700 feet per minute to air supplied to the material at a one-half inch pressure drop through the material and a pore size between 150 and 300 microns.

13. A liquid and gas contact apparatus in accordance with claim 8 including means for holding the upper and lower tips of each element in a spaced relationship, said tip holding means comprising a separate upper screen fixedly secured to a majority of said upper tips of each element and a separate lower screen fixedly secured to a majority of said lower tips of each element, said screens being formed of a material generally more rigid than the material of which the elements are constructed.

14. A liquid and gas contact apparatus in accordance with claim 13 wherein said element support means includes a frame member having a generally rectangular open box configuration with substantially open top, bottom, front and back faces, and a plurality of element support members spaced vertically from one another and secured within said frame member, said front face forming an air inlet at the air inlet side of said elements and said back face forming an air outlet at the air outlet side of said elements, a plurality of elements being stacked one upon another on each support member so that the upper screen of an element supporting another element above it contacts the lower screen of the element supported above it, said first direction extending between the front and back faces of said frame.

15. A liquid and gas contact apparatus in accordance with claim 14 wherein said frame member includes a pair of side members interconnected along said front face by a plurality of front crossbars and interconnected along said back face by a plurality of back crossbars, said front and back crossbars being arranged in opposing pairs, and each element support member including a plurality of transverse bars extending between and connected to a pair of front and back crossbars and a support screen secured to the top of said transverse bars of each element support member, the lower screen of a lowermost media element stacked on an element support member contacting and being supported by the support screen of said last-mentioned element support member.

16. A liquid and gas contact apparatus in accordance with claim 15 wherein each support screen is slanted downwardly toward said air inlet at an angle no greater than 30° above a horizontal plane intersecting a support screen.

17. A liquid and gas contact apparatus in accordance with claim 15 including a front screen secured to the front face and a back screen secured to the back face of said frame member.

18. A liquid and gas contact apparatus in accordance with claim 8 including a contact body housing and a plurality of said contact bodies, said housing supporting said plurality of contact bodies.

19. A liquid and gas contact apparatus in accordance with claim 18 wherein said housing includes a pair of upright sidewall members interconnected by a base member, said base member having a sufficient length to support a plurality of contact bodies in a side-by-side relationship between said upright sidewall members, said sidewall members having a sufficient height to support a plurality of contact bodies one upon another, said water supply means including a water reservoir having an upper surface disposed below said contact bodies, a plurality of water supply conduits extending between and being supported by said sidewall members above said contact bodies, each water supply conduit having a plurality of apertures for spraying water on said contact bodies, and means for pumping water from said reservoir to said water supply conduits.

20. A liquid and gas contact apparatus in accordance with claim 19 wherein said water supply means includes a water inlet at one side of said reservoir adjacent one sidewall member and a water outlet at an opposite side of said reservoir adjacent the other sidewall member, said base member including an apertured screen extending between said sidewall members and forming a portion of the upper surface of said reservoir, said pumping means including a water pump supported adjacent one of said sidewall members, and tubing means providing fluid communication between said reservoir and said pump and between said pump and said supply conduits.

21. A liquid and gas contact apparatus comprising:
 (a) a plurality of contact bodies, each contact body having a frame member and a plurality of pleated porous media elements disposed one above another between a top and a bottom of said frame member;
 (b) a contact body housing having a pair of upright sidewall members interconnected by a base member;
 (c) a plurality of said contact bodies supported in a side-by-side relationship upon said base member to form a first layer of contact bodies between said sidewall members, and additional contact bodies supported in a side-by-side relationship upon said first layer of contact bodies to form at least one additional layer of contact bodies;
 (d) each of said media elements being formed in a generally zig-zag configuration with a plurality of pleats having upper tips and lower tips, each pleat and tip extending in a generally linear first direction across an element;
 (e) air flow passages being formed between the pleats of said element, all of said air flow passages extending in said generally linear first direction;
 (f) said contact body housing having an air inlet side at an end of said air flow passages and an air outlet side at an opposite end of said air flow passages, each of said air flow passages extending in said generally linear first direction between said air inlet and air outlet sides of said contact body;
 (g) means for holding the upper and lower tips of each element in a spaced relationship, said tip holding means including a separate lower screen secured to substantially all the lower tips of each element and a separate upper screen secured to substantially all the upper tips of each element;

(h) each frame member including a plurality of element support members, each element support member supporting a stack of elements in a disposition in which all of said upper and lower screens are transverse to a vertical plane, said vertical plane being transverse to said first direction and said first direction extending between said air inlet side and said air outlet side;

(i) water supply conduits being disposed above said contact bodies for supplying water to said contact bodies;

(j) a water reservoir disposed below and in fluid communication with said contact bodies through said base member;

(k) means for pumping water from said reservoir to said water supply conduits and contact bodies to saturate all of said elements with water and to establish a downward flow of water through said media elements; and (l) each of said screens leaving a major portion of the tips to which it is attached open to permit water flow between adjacent vertically spaced media elements directly through substantially the entire cross-section of each media element and each of said media elements having a porosity sufficient to enable substantially all the water supplied to the top of the uppermost contact bodies by said pump means which flows to said base member to flow directly through the material of said media elements through substantially the entire cross-section of each media element.

22. A liquid and gas contact apparatus in accordance with claim 21 wherein said support members support said elements in a disposition in which all of the upper and lower screens slant downwardly toward said air inlet side at an angle less than 30° to a horizontal plane whereby excess water which does not saturate into the elements flows toward said air inlet side.

* * * * *